United States Patent

[11] 3,634,666

[72] Inventor Robert A. Ragen
Hayward, Calif.
[21] Appl. No. 779,666
[22] Filed Nov. 29, 1968
[45] Patented Jan. 11, 1972
[73] Assignee The Singer Company
Original application Oct. 29, 1963, Ser. No. 319,704, now Patent No. 3,546,676, dated Dec. 8, 1970. Divided and this application Nov. 29, 1968, Ser. No. 779,666

[54] ELECTRONIC DESK TOP CALCULATOR HAVING A DELAY LINE AND AUTOMATIC DECIMAL ALIGNMENT

27 Claims, 4 Drawing Figs.

[52] U.S. Cl. .......... 235/156, 235/159, 235/160
[51] Int. Cl. .......... G06f 7/38
[50] Field of Search .......... 235/156, 159, 160, 165, 167; 340/172.5

[56] References Cited

UNITED STATES PATENTS

| | | | |
|---|---|---|---|
| 3,021,066 | 2/1962 | Martens .......... | 235/160 |
| 3,074,635 | 1/1963 | Borne et al. .......... | 235/156 |
| 2,783,455 | 2/1957 | Hindall .......... | 235/165 X |
| 3,166,636 | 1/1965 | Rutland et al. .......... | 235/156 X |
| 3,391,391 | 7/1968 | Simpson, Sr. .......... | 235/160 X |
| 3,330,946 | 7/1967 | Scuitto .......... | 235/160 |
| 3,174,106 | 3/1965 | Urban .......... | 235/160 X |

*Primary Examiner*—Malcolm A. Morrison
*Assistant Examiner*—David H. Malzahn
*Attorney*—Charles R. Lepchinsky

ABSTRACT: An electronic desk top calculator having a recirculating memory and an arithmetic unit comprising a plurality of single character registers, which are shared with the memory. Data shifting operations, as well as some arithmetic operations, are performed by shifting data entered into an entry register a number of digit order positions controlled by the setting in a decimal point counter. The decimal point counter is controlled by a multiposition switch and other circuitry actuatable by a decimal point key.

EXAMPLE OF NOTATION: P(2+9)P = "THE DECIMAL POINT IS IN THE SECOND OR NINTH PLACE."

INVENTOR.
Robert A. Ragen
BY Warren P. Kujawa

ELECTRONIC DESK TOP CALCULATOR HAVING A DELAY LINE AND AUTOMATIC DECIMAL ALIGNMENT

Statement of Related Cases

This application is a division of U.S. Pat. application, Ser. No. 319,704, filed Oct. 29, 1963 now U.S. Pat. No. 3,546,676 issued Dec. 8, 1970.

Summary of the Invention

The invention comprises a novel electronic desk top calculator having several novel features. In a first aspect, the calculator is provided with a recirculating memory for serially recirculating a field word of data, and an arithmetic unit for performing data handling and arithmetic operations on the data. The arithmetic unit comprises a plurality of single character registers, a subplurality of which are connected to provide a normal path for progression of data through the arithmetic unit so that data cyclically emerges from the memory, normally progresses through the arithmetic unit via this normal path, and reenters the memory, all under control of a timing unit.

Remaining ones of the plurality of single character registers provide alternate data paths for modifying data. One such data path is provided by inserting an additional single character register into the normal path between two parallel connected single character registers. By timing this insertion properly, SHIFT UP and SHIFT LEFT of various portions of the data is effected. Another such alternate data path is provided by removing one of the single character registers from the normal data path. By timing this removal properly, SHIFT DOWN of various portions of the data is effected. Still other alternate data paths are provided by various combinations of the single character registers to effect other modifications of the data.

In a second aspect, the calculator is provided with a decimal point control system for decimal alignment of data. All data enters the calculator via an entry register. A keyboard mounted switch establishes the desired number of decimal digit positions in the entry register. Actuation of any one of several function keys after digit entry causes a counter to be set to the N's complement of the number specified by the keyboard switch, where N equals the total number of possible states of the counter. Shift control logic then shifts the data in the entry register, incrementing the counter for each order shift. When the counter reaches a predetermined state, the shift control logic is disabled by the counter output and decimal alignment of the data is complete.

The decimal point control system further includes a manually actuatable decimal point key for setting the counter in the manner noted above and enabling the counter to be incremented for each decimal digit entered thereafter into the register.

A decimal interlock circuit is also provided which prevents entry of more decimal digits than the desired number of decimal digit positions specified by the above-noted keyboard switch.

For a fuller understanding of the nature and advantages of the invention, reference should be had to the following description taken in conjunction with the accompanying drawings.

Brief Description of the Drawings

FIG. 372 is a block diagram of the calculator embodying the invention;

Description of the Preferred Embodiment

Figures 190, 191:
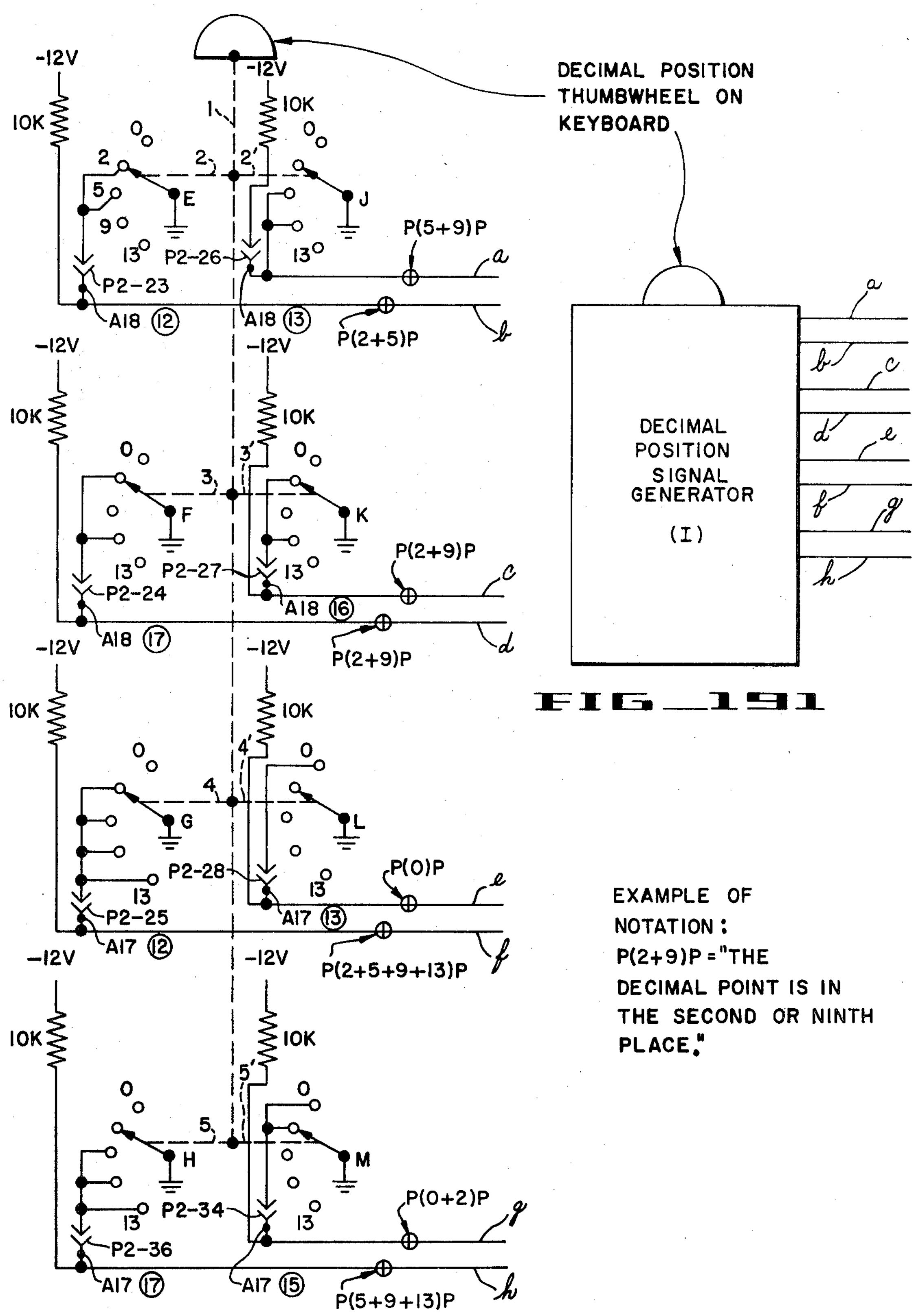
FIGS. 190 and 191 show the circuit and block symbol illustrating the preferred embodiment of the decimal position signal generator.

FIG. 372 is a block diagram of a calculator embodying the invention. In the ensuing description, reference is made to several sections and figures contained in U.S. Pat. application, Ser. No. 319,704 filed Oct. 29, 1963 by R. A. Ragen now Pat. No. 3,546,636 and assigned to the assignee of the present invention, the disclosure of which is hereby incorporated by reference.

In FIG. 372, the six basic units of the calculators are indicated by broken rectangles, while the major components included in each basic unit are indicated by solid rectangles. Interconnections between the various components and units are generally indicated in FIG. 372 by solid arrowed lines. The actual structure and specific interconnections of the components can be ascertained by reference to the sections and figures of the aforementioned Ragen Patent indicated below. In the ensuing description of FIG. 372, those reference figures which comprise portions of the logic diagram (Section 16.1) are enclosed in parentheses, while those figures which comprise portions of the more detailed circuit diagram (Section 14.4) are not.

As shown in FIG. 372, an entry unit 10 is coupled to a control unit 20, an arithmetic unit 30, and a display unit 40. Entry unit 10 comprises a keyboard 12, and an encoder 14. As shown in FIGS. 182–185 (FIGS. 297, 298), keyboard 12, which enables operator entry of numeric data and control of functions to be performed by the calculator, comprises a plurality of digit keys 0, 1, ... 9, a plurality of function keys, e.g., ADD, SUBTRACT, CLEAR, etc., and their associated switches. Encoder 14, which serves to translate the actuation of various keys into signals which enable selected components of control unit 20, arithmetic unit 30, and display unit 40, comprises the components specified in Section 16.1.4 and shown in detail in FIGS. 182–189, 196, 197, 225–234, and 246 (FIGS. 297, 298).

Control unit 20, which generally produces control signals which direct the flow of data through arithmetic unit 30 comprises a decimal point counter 22, a subtract logic circuit 24, an entry phase counter 26, an add logic circuit 28, and a shift control logic circuit 29. The inputs of the first four of these components are each coupled to encoder 14, while their outputs are each coupled to shift control logic 29. Shift control logic 29 is coupled to arithmetic unit 30, to display unit 40, and to the input side of decimal point counter 22. The output of entry phase counter 26 is additionally coupled to intensity control circuit 42 of display unit 40.

Decimal point counter 22, which provides control signals to shift control logic 29 during decimal align, multiply, and divide, comprises four flip-flops interconnected as shown in FIG. 240 (FIG. 302) and having inputs as specified in these figures. The outputs of the decimal point counter flip-flops are connected to various portions of shift control logic 29, e.g., to the inputs of gate 40 as shown in FIG. 243 (FIG. 302).

Entry phase counter 26, which provides control signals to add logic 28, subtract logic 24, shift control 29, and intensity control 42, comprises three flip-flops interconnected as shown in FIG. 238 (FIG. 301) and having inputs as specified in these FIGS. The outputs of the entry phase counter flip-flops are connected to portions of add logic 28 and subtract logic 24 as shown in FIG. 228, and to various portions of shift control logic 29, e.g., to gates 74 and 76 which are coupled to gates 80 and 82, respectively, as shown in FIGS. 254, 255, and 257 (FIGS. 304, 306.)

Add logic 28 and subtract logic 24, which provide enabling signals to shift control logic 29 during ADD and SUBTRACT operations, comprise an add flip-flop and a subtract flip-flop whose inputs are connected as shown in FIG. 228 to the specified outputs of encoder 12 and entry phase counter 26, and gate 6, the inputs to which are the set outputs of the add and subtract flip-flops as shown in FIG. 233. The outputs of add logic 28 and subtract logic 24 are coupled to shift control logic 29, e.g., via gates 15, 26, and 48 to gate 78 as shown in FIGS. 236, 239, 247, and 256 (FIGS. 301, 303, 306).

Shift control logic 29, which provides several shift control signals which control the path of data through arithmetic unit 30 during the various states of the calculator as described below, comprises numerous logic elements which are interconnected as shown in FIGS. 225–294 of the above-mentioned circuit diagram (FIGS. 297–313 of the logic diagram). For example, gates 84, 86, 85, and 81 of shift control logic 29 are coupled to A counter 32, B counter 34, C counter 36, and D counter 38, respectively, as shown in FIGS. 257, 258, and 263–275 (FIGS. 305–309). Also, gate 81 of shift control logic 29 is coupled to the horizontal staircase generator portion of deflection control circuit 44, as shown in FIGS. 211, 212, and 257 (FIGS. 306, 313).

Arithmetic unit 30, which is coupled to the other basic units as noted above, comprises four digisters 32, 34, 36, and 38 which in the preferred embodiment are counters. Each counter comprises five flip-flops interconnected in a special way and associated gates. Alternate interconnections are provided between the various counters so that a digit may be transferred between interconnected counters. The flip-flop interconnections for A counter 32, B counter 34, C counter 36, D counter 38, as well as the between counter interconnections, are shown in FIGS. 261–265, 266–268, 272–274, and 269–271, respectively. As discussed more fully below, the output of read amplifier 56 of memory unit 50 is coupled to the input of A counter 32 and D counter 38. Further, the output of C counter 36 is coupled to write amplifier 52 of memory unit 50 via gates 101 and 102 as shown in FIGS. 275 and 276 (FIGS. 308, 309).

Display unit 40 comprises intensity control circuit 42 which is coupled to deflection control circuit 44 and visual readout device 46. Intensity control circuit 42 and deflection control circuit 44 comprises the components shown in detail in FIGS. 194, 195, 207–224, and 277–283 (FIGS. 310, 313), while visual readout device 46 comprises a cathode ray tube, the schematic for which is shown in FIG. 283.

Memory unit 50 comprises a write amplifier 52, a delay line 54, and a read amplifier 56. Write amplifier 52, which is shown in detail in FIG. 201, is coupled to delay line 54 as shown in FIG. 276. Delay line 54 is coupled to read amplifier 56 in the manner illustrated in FIGS. 276. Read amplifier 56, which is shown in detail in FIG. 198, is coupled to A counter 32 of arithmetic unit 30 via gate 90 as shown in FIGS. 260 and 261 (FIG. 306). Read amplifier 56 is also coupled to D counter 38 of arithmetic unit 30 via gate 89 as shown in FIGS. 260 and 261 (FIGS. 306).

Timing unit 60, which provides timing signals to the other five basic units, comprises six major components—an oscillator 62, a clock 64, a bit counter 66, a register counter 67, a column counter 68, and a display counter 69. Oscillator 62, shown in detail in FIG. 200, is coupled to clock 64 via gate 99 as shown in FIG. 284. Clock 64, in turn, is coupled to the first of a series of interconnected flip-flops, the first three of which comprise bit counter 66, as shown in FIG. 286. Bit counter 66 is coupled to register counter 67, which comprises the next four interconnected flip-flops as shown in FIGS. 286, and 288. Register counter 67 is coupled to column counter 68, which comprises the succeeding four interconnected flip-flops as shown in FIG. 290. Column counter 68 is coupled to display counter 69 via gates 120 and 122 as seen in FIG. 291 and gate 123 as shown by FIG. 293. The interconnections between the various components of timing unit 60 and the other basic units are schematically portrayed in the logic diagram (FIGS. 297–313) and specifically shown in the circuit diagram, FIGS. 225–294.

GENERAL OPERATION

The general operation of the preferred embodiment of FIG. 372 can be best understood by assuming a problem, for example addition of the digits "2" and "7". To begin, the operator actuates the digit "2" key on keyboard 12. This keyboard information is translated into machine instruction signals by encoder circuit 14 and presented to the input circuit of D counter 38 but does not enter the D counter at this time. Encoder circuit 14 also presents decimal alignment information to decimal point counter 22 and causes entry phase counter 26 to begin cycling through a predetermined program.

If the digit "2" is the first digit of a number to be entered (which is true in this case), entry phase counter 26 initiates a SHIFT UP, by actuating shift control logic circuit 29, whereby the contents of the recirculating registers R1, R2, R3, and R4 of the delay line memory are shifted up. This step requires a single pass of the field word through arithmetic unit 230 and, as discussed in detail, in Section 16.7.5, results in all zeros in register R1. The SHIFT UP is accomplished by transfer of the data from A counter 32 to D counter 38, and simultaneously from the D counter to B counter 34 during every R1, R2, R3, and R4 register time. It is noted that during SHIFT UP, there is no direct transfer from A counter 32 to B counter 34 during any of these register times. Also, during RS and RO register times, data follows the normal path from A counter 32 to B counter 34 to C counter 36.

Entry phase counter 26 next initiates a SHIFT LEFT R1 by actuating shift control logic 29, whereby the contents of register R1 are shifted on column to the left. As discussed more fully in Section 16.4, this SHIFT LEFT R1 first causes the data (the digit "2") that was initially presented to the input circuit of D counter 38 to be entered into the D counter, and then causes this data to be inserted into the memory loop at the C2R1 position, i.e., during Column 2, Register 1 time. SHIFT LEFT R1 is accomplished by initiating a transfer from A counter 32 to D counter 38 and simultaneously from the D counter to B counter 34 during each R1 register time. At such time, there is no direct transfer from A counter 32 to B counter 34. During the remaining register times (RS, RO, R2, R3, and R4) data follows the normal path. As with the SHIFT UP step, SHIFT LEFT R1 takes place during one pass or cycle through arithmetic unit 30.

After the SHIFT LEFT R1 step, the calculator returns to the IDLE condition. Digit "2" now appears in the C2R1 position of the recirculating information.

During the SHIFT UP and SHIfT LEFT procedures and during any rearrangement or modification of the data contained in the respective register positions, visual readout device 46 is blanked. Blanking is achieved by applying a blanking signal from entry phase counter 26 to display intensity control circuit 42. It should be noted that, as discussed more fully in Sections 16.3 and 16.11, the register contents are displayed by visual readout device 46 during the cleared and the IDLE conditions only. At other times, entry phase counter 26 serves to blank readout device 46.

The operation of the calculator during DISPLAY mode is as follows. When data which is to be displayed appears in A counter 32, the data is shifted by parallel transfer or broadsiding into D counter 38. While in the D counter, this data controls display intensity control circuit 42, so that the proper segments that are necessary to trace out the digit on the screen of the cathode-ray tube display are selected and intensified for visual readout.

Display deflection control circuit 44 deflects the electron beam of the cathode-ray tube display so that the beam traverses the configuration of a figure eight and a decimal point for each column position of each register to be displayed. However, only those segments that correspond to the digit in the D counter will be intensified, while the other segments or strokes of the electron beam will be blanked. Display intensity control circuit 42 acts to energize the cathode-ray tube, whereas display deflection control circuit 44 serves to deflect the electron beam generated by the cathode-ray tube. For a more detailed discussion of machine operation during the DISPLAY mode, see Section 16.11.

As noted above, during the IDLE condition, the flow of data in memory unit 50 and arithmetic unit 30 is from delay line 54 to read amplifier 56, serially to A counter 32, then parallel or broadside from the A counter to B counter 34, parallel from the B counter to C counter 36, serially from the C counter to write amplifier 52 and then back to delay line 54. In this manner, a closed memory loop is formed in which information may be cycled repeatedly.

After entry of the digit "2", the ENTER key of the keyboard is depressed. Actuation of this key establishes that the last digit of a number has been entered into the memory unit. In this example, "2" is the first and last digit of the number. Entry phase counter 26 then causes shift control logic 29 to decimal align the number now entered in register R1.

The operator next inserts the next digit word, which in this example is the digit "7", and the calculator follows the same format as set forth above. In this case, during the SHIFT UP step, the digit word "2" is shifted up from register R1 to the next register R2, and then the digit word "7" is entered into register R1.

The operator then actuates the ADD function key in order to effectuate a summation of the digits "2" and "7". When the ADD key is actuated, encoder circuit 14 translates this action into machine commands. One output signal from encoder circuit 14 triggers entry phase counter 26 to cycle through a predetermined program, which is built into the machine.

The first step of the ADD program is decimal alignment, if necessary. This alignment is controlled by shift control logic 29 and decimal point counter 22. Shift control logic 29 shifts information in the R1 register to the left, until decimal point counter 22 determines that the number in register R1 is decimally aligned. For a more detailed discussion of machine operation during decimal alignment, see the discussion below of FIG. 373.

Entry phase counter 26 next causes the information in Registers R1, R2, R3, and R4 to be shifted down by one register. The SHIFT DOWN action is controlled by shift control logic 29, which causes a direct transfer from A counter 32 to C counter 36 during R1, R2, R3, and R4 register times. As a result, the two digit words or numbers "2" and "7" which are to be added are placed in the R1 and R0 (M/D) registers, respectively. For a more detailed discussion of machine operation during this SHIfT DOWN action, see Section 16.7.3. Entry phase counter 26 then activates add logic circuit 28 so that addition can be performed by arithmetic unit 30.

Addition is performed by adding like-order digits of the data contained in registers R0 and R1 after the above-described SHIFT DOWN action. For each order, this is accomplished by transferring the R0 digit into A counter 32, inhibiting reset of the A counter, and then transferring the R1 digit into A counter 32 on top of the RO digit. To illustrate, using the above example the RO digit "7" is first sequenced into A counter 32 from read amplifier 56. Next, the normal between-transfer resetting of the A counter to zero is inhibited by shift control logic 29 in response to an enabling signal from add logic 28. Then, the R1 digit "2" is sequenced into A counter 32. Since A counter 32 still contains the count of seven at the beginning of this latter step, the result of this latter sequencing is a count of nine (7+2=9) in the A counter. This resulting digit, the sum of the two digits, is then transferred in the normal way to B counter 34, then to C counter 36, etc. The above sequence A—inhibit reset A—sequence A action is followed for all orders C2–C14 of the RO and R1 register digits, and is accomplished in one pass of the field word through the arithmetic unit 30. Upon conclusion of the ADD operation, the calculator returns automatically to IDLE condition and DISPLAY mode. For a more detailed discussion of machine operation during ADD, see Section 16.7.9.

To simplify illustration of the SUBTRACT operation, assume that digit words representing a minuend and a subtrahend have already been entered in registers R2 and R1, respectively, and decimal aligned, in the manner described above. The operator then actuates the SUBTRACT function key, which action is translated by encoder circuit 14 into machine commands. One output signal from encoder circuit 14 triggers entry phase counter 26, which causes the decimally aligned contents of registers R1, R2, R3, and R4 to be shifted down by one register in the same manner as has been described above in the discussion of the ADD operation so that the minuend and subtrahend are shifted into the R1 and R0 (M/D) registers, respectively. Next, entry phase counter 26 actuates subtract logic circuit 24 so that subtraction can be performed by arithmetic unit 30.

Subtraction is performed by complementary addition of like-order R0 and R1 digits, that is, each R1 digit is added to the complement of each like-order R0 digit. This is accomplished as follows. In response to an enabling signal from subtract logic 24, shift control logic 29 causes the R0 digit from read amp 56 to sequence D counter 38. Since, as described in Section 16.2.6, D counter 38 is a recedable digister, this sequencing of the D counter results in the complement of the R0 digit being developed in D counter 38. The complemented Ro digit is then parallel transferred or broadsided into A counter 32. The R1 digit is next sequenced into the A counter on top of the complemented R0 digit. The resulting digit, representing the remainder or difference between the original, like-order R1 and R0 digits, is then transferred in the normal way to B counter 34, then to C counter 36, etc. This action is followed for all orders C2–C14 of the R0 and R1 register digits and is accomplished in one pass of the filed word through arithmetic unit 30.

At the end of this pass, if originally the subtrahend was larger than the minuend, the contents of the R1 register will represent the complement of the desired answer. In such a case, shift control logic 29, in response to an enabling signal from subtract logic 24, causes R1 data to be complemented and the arithmetic sign to be changed during a second pass of the field word through arithmetic unit 30. The arithmetic sign of the R1 data is changed by adding one to the C1R1 digit position (the sign digit position). The R1 data is complemented by sequencing D counter 38 directly from read amplifier 56 for each R1 digit. As noted above, sequencing the D counter causes the complement of the sequencing digit to be developed in D counter 38. This complemented digit is then parallel transferred to B counter 34, while the normal A counter to B counter transfer is simultaneously inhibited by shift logic 29. From B counter 34, the complemented R1 digit is transferred to C counter 36 in the normal way. After the R1 data has been complemented, the calculator returns automatically to IDLE condition and DISPLAY mode. For a more detailed discussion of machine operation during SUBTRACT, see Sections 16.7.10 and 16.7.11.

To simplify illustration of the MULTIPLY operation, assume that digit words representing a multiplier and a multiplicand have already been entered in registers R2 and R1, respectively, and decimal aligned. The operator then actuates the MULTIPLY function key, which action is translated by encoder 14 into machine commands. One output signal from encoder circuit 14 triggers entry phase counter 26, which directs shift control logic 29 to shift the decimally aligned contents of register R1 down into the R0 register, and clear the R1 register. This is achieved by transferring data from A counter 32 to C counter 36 during each R1 register time and is discussed in detail in Section 16.7.12.

Multiplication is performed by repeated addition of the multiplicand in register R0 to the contents of register R1 a number of times which is controlled by the multiplier in register R2. This is accomplished by shifting R2 data left, leaving the highest order or most significant R2 digit (MSDR2) in D counter 38, and using this digit to control the number of ADD cycles. During each ADD cycle, the contents of register R0 (the multiplicand) are added to the contents of register R1 (initially zero). D counter 38 is sequenced after each ADD cycle is completed. When the digit in the D counter has been receded or counted down to zero, shift logic 29 causes the contents of register R1 to be shifted one column to the left during one pass of the field word through arithmetic unit 30, leaving the highest order or most significant R1 digit (MSDR1) in D counter 38 at the end of the pass. Shift logic 29 then causes the contents of register R2 to be shifted left during the next pass of the field word through arithmetic unit 30. At the beginning of this data pass, the digit in D counter 38 (MSDR1) is placed in the least significant digit (LSD) position of register R2 (the C2R2 position), while the most significant R2 digit (MSDR2) is left in the D counter at the end of this pass. This digit is then used to control the number of ADD cycles as described above.

Successive series of repetitive ADD cycles and SHIFT LEFT R1 and SHIFT LEFT R2 steps are performed until each digit of the original multiplier in register R2 has been used to control the repetitive ADD cycles. Since MSDR1 is relocated in LSDR2 once for each series of ADD cycles by the combined action of SHIfT LEFT R1 and SHIFT LEFT R2, after the original LSDR2 has been placed in D counter 38 and the D counter has been receded to zero, the product of the original multiplier and multiplicand will be located in register R2.

Entry phase counter 26 then causes shift logic 29 to shift down the contents of registers R2, R3, and R4 by one register. With the product now located in register R1, and the MULTIPLY operation completed, the calculator returns automatically to IDLE condition and DISPLAY mode. For a more detailed discussion of machine operation during MULTIPLY, see Sections 16.7.4 and 16.8.

To simplify illustration of the DIVIDE operation, assume that digit words representing a dividend and a divisor have already been entered in registers R2 and R1, respectively, and decimal aligned. The operator then actuates the DIVIDE function key, which action is translated by encoder circuit 14 into machine commands. One output signal from encoder circuit 14 triggers entry phase counter 26, which directs shift control logic 29 to shift the decimally aligned contents of register R1 down into the R0 register, and clear the R1 register. This is achieved in the same manner as discussed above in the description of the MULTIPLY operation.

Division is performed by repeated subtraction of the divisor in register R0 from the dividend which is progressively shifted from register R2 into register R1 and counting the number of successful subtractions. Subtraction is performed by complementary addition as described above in the discussion of the SUBTRACT operation. During the DIVIDE operation, the contents of register R0 are subtracted from the contents of register R1 and "1" is added to register R2 whenever the remainder in register R1 is positive. When the remainder is negative, entry phase counter 26 causes add logic circuit 28 to restore the former contents of register R1 by adding R0 to R1. Next, entry phase counter 26 causes shift logic 29 to shift the contents of register R2 one column to the left during one pass of the field word through arithmetic unit 30, leaving MSDR2 in D counter 38 at the end of the pass. Shift logic 29 then causes the contents of register R1 to be shifted left during the next pass of the field word through arithmetic unit 30. At the beginning of this data pass, the digit in D counter 38 (MSDR2) is placed in the least significant digit position of register R1 (C2R1 position). After this SHIFT LEFT R1 step, repetitive subtraction of R0 from R1 is again performed, "1" is added to register R2 for each successful subtraction until the remainder in register R1 again is negative, after which the contents of register R1 are restored and the above shifting operations are again performed.

Successive series of repetitive SUBTRACT cycles and SHIfT LEFT R2 and SHIFT LEFT R1 steps are performed until the least significant digit of register R2 has been shifted into the least significant digit position of register R1, successive subtract cycles have been performed, a negative remainder in register R1 has bee obtained, and the contents of register R1 have been restored. Since "1" has been added to register R2 for each successful SUBTRACT cycle and since this sum has been shifted left once during each SHIFT LEFT R2 step, after the final restoration of the contents of register R1, the quotient of the original dividend and divisor will be located in register R2.

Entry phase counter 26 next causes shift logic 29 to SHIFT DOWN the contents of register R2, R3, and R4 by one register. With the quotient now located in register R1, and the DIVIDE operation completed, the calculator returns automatically to IDLE condition and DISPLAY mode. For a more detailed discussion of machine operation during DIVIDE, see Sections 16.7.4 and 16.9.

In addition to the above-described data handling operations and suboperations, which set forth calculator operation during the four basic arithmetic operations of ADD, SUBTRACT, MULTIPLY, and DIVIDE, the calculator is also capable of performing other operations and suboperations such as CLEAR ALL and STORE which are not vital to an understanding of the simplified FIG. 372 block diagram.

Timing unit 60 provides the timing signals that determine the time relations between the various operations described herein. Clock circuit 64, which is driven by the output of oscillator 62, produces one pulse for each bit time. These pulses are applied inturn to bit counter 66, register counter 67, column counter 68 and display counter 69, the outputs of each of which define a discreet time interval related to the presentation of the data.

Although oscillator 62 runs continuously, the output of clock 64 is stopped by the leading portion of the first column time, i.e., CORS register time. Clock 64 is started by the appearance of the leading synchronization pulse each time the data is first made available at the output end of delay line 54. In this manner, the data is synchronized so that portions thereof may be properly identified relative to their respective register positions as the data is read off delay line 54 and also while the data is in the various portions of arithmetic unit 30. For a more detailed discussion of this start-stop feature of timing system 60, see Section 16.5.

Figure 373:
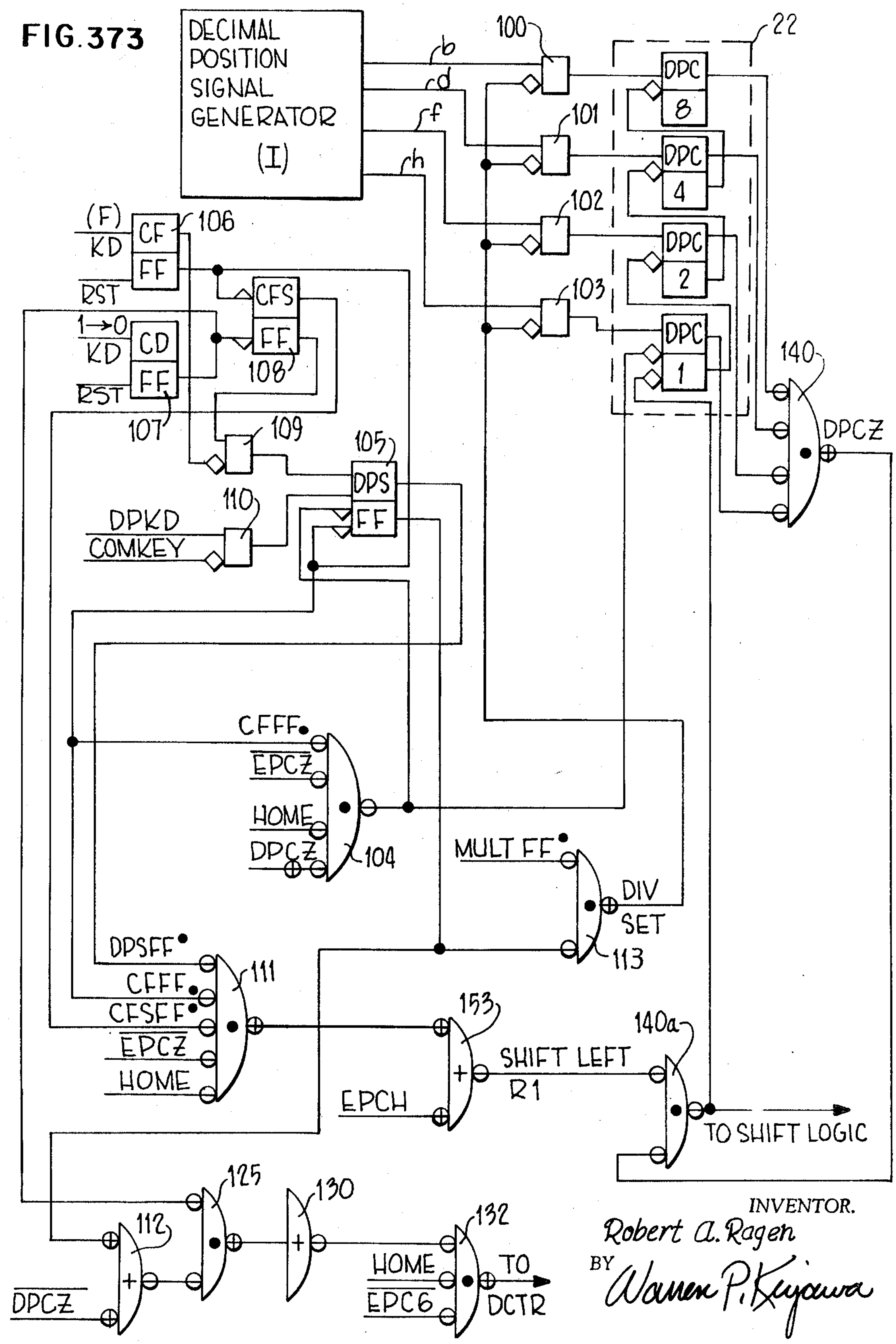
FIG. 373 is a diagram illustrating the decimal point control system.

FIG. 373 illustrated in detail those portions of the calculator which comprise the decimal point control system for aligning data entered in entry register R1 to a predetermined decimal significance. In the ensuing description, the last two digits of the reference numerals identifying the logic gates correspond exactly to the reference numerals used to identify the same gates in the referenced parent Ragen application. For example, gate 113 in the instant patent corresponds to gate 13 in the referenced application; gate 140 corresponds to gate 40; etc. In addition, the figure wherein each described element is illustrated in the referenced application is given in parentheses after the first reference thereto.

Turning now to FIG. 373, four outputs *b*, *d*, *f*, and *h* of a decimal position signal generator I (FIG. 190) are coupled to the DC inputs of four AC AND-gates 100–103 (FIG. 204), respectively. The AC input to each of gates 100–103 is coupled to the reset output of a decimal point storage flip-flop 105 (FIG. 232), hereinafter designated DPSFF 105, through inverting AND-gate 113 (FIG. 235). The output from each of gates 100–103 is coupled to the set input of flip-flops DPCl, DPC2, DPC4, DPC8, respectively (FIG. 240), which together comprise decimal point counter 22. Flip-flops DPC1, DPC2, DPC4, and DPC8 are interconnected in a known way to form a scale of 16 counter. Whenever DIV SET signal goes true at the output of gate 113, each one of those gates 100–103 whose DC input from decimal position signal generator I is conditioned true will set its respective flip-flop DPC1, DPC2, DPC4, or DPC8.

FIG. 190 shows the preferred embodiment of decimal position signal generator I. The semicircle shown illustrated at the top of this figure represents a decimal position setting thumbwheel mounted on the calculator keyboard. This thumbwheel is connected to the shaft of a multideck rotary shaft, the shaft being represented by broken lines. Although eight decks E, F, G, H, J, K, L, and M are illustrated, only the E, F, G, and H decks are utilized in the invention. For the sake of brevity, the ensuing description is directed to these latter four decks.

Each of the decks contain five stationary contacts labeled 0, 2, 5, 9, and 13 which correspond to the desired number of decimal positions in entry register R1. Selected ones of the stationary contacts on each of the decks are connected to a source of negative potential according to a predetermined code while the rotary contact of each deck is connected to ground. Output leads *b*, *d*, *f*, and *h* are connected to the stationary contacts E, F, G, and H. Using the signal convention that a positive or ground signal represents a one and a negative signal represents a zero, and considering the H deck to represent the least significant digit in a four-place binary code, it can be seen that the output signals on leads *b*, *d*, *f*, and *h* from the E, F, G, and H decks for the illustrated switch setting, which specifies two decimal positions, are equal to 1110, the binary representation of decimal 14. Similarly, setting the thumbwheel switch to the 5, 9, or 13 position results in the binary representation for decimal digit 11, 7, or 3, respectively. The binary output of decimal position signal generator I thus represents the decimal 16's complement of the desired number of decimal positions specified by the thumbwheel switch.

With reference to FIG. 373, as will now be evident when DIV SET signal transitions true, decimal point counter 22 will be set by the coded leads *b*, *d*, *f*, and *h* of decimal position signal generator I to the 16's complement of the desired number of decimal positions. This count controls alignment of the data in entry register R1.

The set outputs of flip-flops DPC1, 2, 4, and 8 comprise the four inputs to inverting AND-gate 140 (FIG. 243). Since the output of gate 140 will only be true if all the inputs are false—corresponding to a zero state of decimal point counter 22—this output is labeled DPCZ or decimal point counter zero. The output of gate 140 is applied to the input of gate 140*a* (FIG. 243) along with the output of inverting OR-gate 153 (FIG. 248) labeled SHIFT LEFT R1. The output of gate 140*a* is applied to the toggle input of DPC1 flip-flop along with the output of AND-gate 104 (FIG. 232). As will be apparent to those skilled in the art, a positive transition at the toggle input of DPC1 will advance decimal point counter 22 by one count.

The interconnections and functional relationships of the remaining circuitry of the FIG. 373 system will become apparent from the ensuing description.

Figure 2:
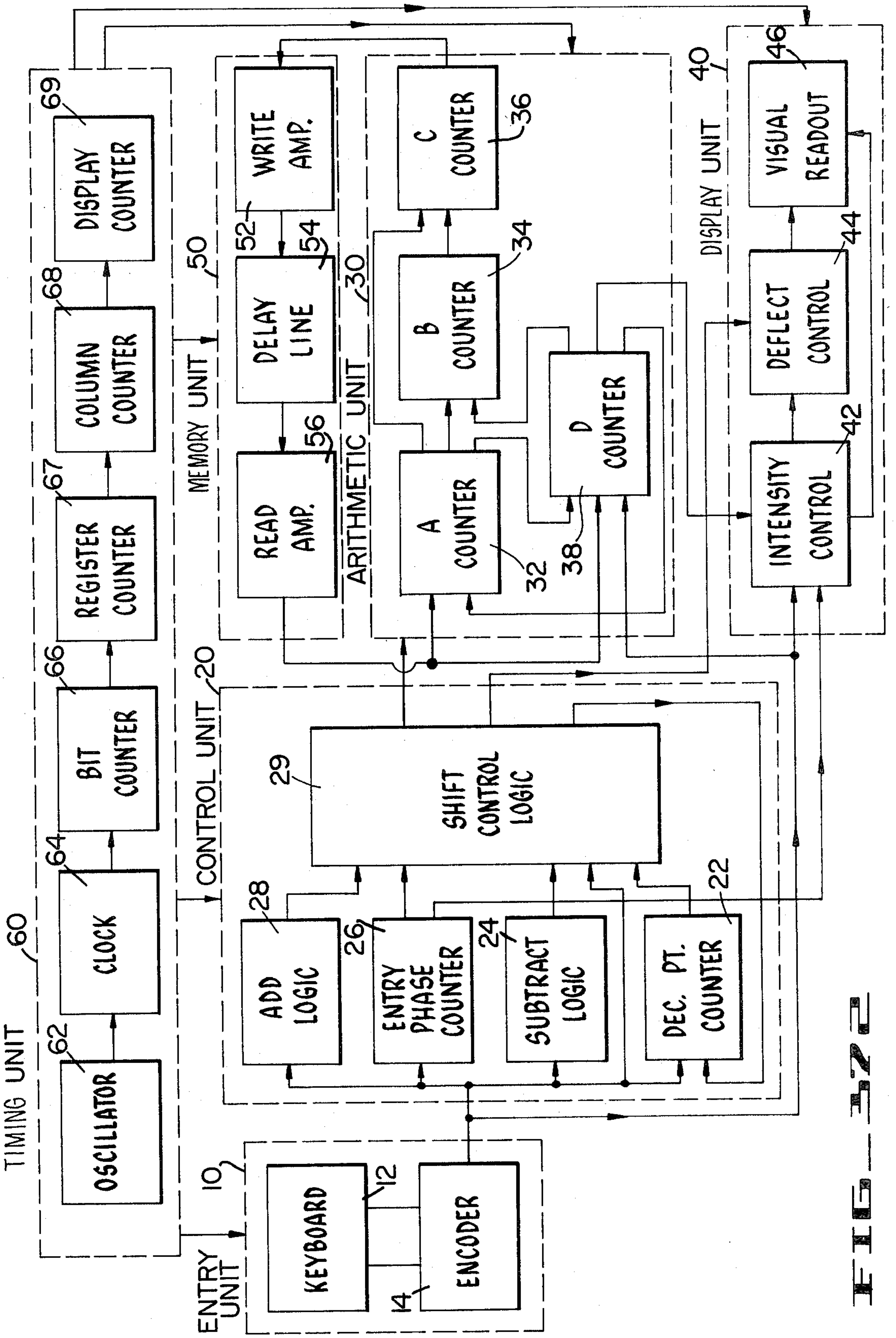

The operation of the decimal point control system of FIG. 2 proceeds as follows. Initially, common function flip-flop 106 (FIG. 230), hereinafter CFFF 106, common digit flip-flop 107 (FIG. 230), hereinafter CDFF 107, and DPSFF 105 are all reset, and entry phase counter 26 of FIG. 1 is zero. Actuation of any digit key will set CDFF 107 and step entry phase counter 26 off zero. Upon termination of digit entry, entry phase counter 26 is automatically reset to the zero state, CDFF 107 is reset by circuitry (not shown), and the positive transition at CDFF 107 reset output resets common function storage flip-flop 108 (FIG. 232) hereinafter CFSFF 108. This sequence of events is repeated for each digit entered.

Assuming the number entered has no decimal digits, after entry of the last digit, a function key (e.g., ENTER) is always actuated. Actuation of the function key sets CFFF 106. The positive transition at the set output of CFFF 106 is applied to the AC input of AC AND-gate 109 (FIG. 232). Since the DC input to gate 109 is true (CFSFF 108 reset), this gate products an output to set DPSFF 105. Setting of DPSFF 105 causes the reset output of this flip-flop, which is coupled to the input of gate 113, to transition false. Since the other input to gate 113 will always be false when entry phase counter 26 is zero, gate 113 produces a positive transition causing decimal point counter 22 to be set to the 16's complement of the desired number of decimal positions in the manner already noted.

Assuming the decimal position signal generator I switch is set to a number other than zero, setting of decimal point counter 22 causes the output DPCZ signal of gate 140 to be false. DPCZ signal false is applied to the input of gate 104 along with reset output of CFFF 106, and $\overline{\text{EPCZ}}$ and HOME signals. Since entry phase counter 26 is zero, $\overline{\text{EPCZ}}$ signal is false. HOME signal will also be false until OCFF (FIG. 284) is set by CO signal from column counter 68 of timing unit 60 of FIG. 372. Since all the inputs to gate 104 are false, the output is also false. When HOME signal transitions true, the output of gate 104 goes true, resetting DPSFF 105 and advancing decimal point counter 22 by one count.

After DPSFF 105 is reset, the set output of DPSFF 105 applied to the input of gate 111 is false. Since CFSFF 108 is still reset, and CFFF 106 is set, the CFSFF 108 set and CFFF 106 reset outputs applied to the input of gate 111 are also false. $\overline{\text{EPCZ}}$ signal is likewise false. When HOME signal goes false at the beginning of the data train, the output of gate 111 goes true. This true output is inverted false by gate 153 producing a SHIFT LEFT R1 signal which is applied to various portions of shift control logic 29 of FIG. 372. Whenever the SHIFT LEFT R1 signal is present, the digits in entry register R1 are shifted left one order position for each data pass through arithmetic unit 30 of FIG. 372.

At the conclusion of each data pass, HOME signal transitions true at the input of gate 111. The output of gate 111 accordingly transitions false, inverted true by gate 153 and applied to the input of gate 140*a*. When this input to gate 140*a* goes true, the output of this gate also transitions true and advances decimal point counter 22 by one count. Thus, decimal point counter 22 is advanced by one count for each data pass which shifts left the digits in entry register R1. When HOME signal again goes false at the beginning of the data train, gates 111 and 153 again produce a SHIFT LEFT R1 signal and the digits in entry register R1 are again shifted left one order position.

This sequence of shift left entry register R1-advance decimal point counter 22 continues until decimal point counter 22 is advanced from a count of fifteen to zero. When DPCZ signal goes true, entry phase counter 26 is stepped off zero by circuitry (not shown), gates 104 and 111 are disabled, and decimal alignment of entry register R1 is complete.

The operation of the decimal point control system of FIG. 373 proceeds in a different manner if the number entered has both whole number digits and decimal digits. The entry of whole number digits proceeds as already described. When the decimal point key is actuated by the operator, indicating that entry of whole number digits is complete, AC AND-gate 110 (FIG. 232) is enabled by the concurrence of DPKD and COM KEY signals and produces an output signal which sets DPSFF 105. As described above, setting of DPSFF 105 causes decimal point counter 22 to be set to the 16's complement of the desired number of decimal positions, and DPCZ signal goes false at the input of gate 140*a*. Since CFFF 106 is not set at this time by actuation of a function key, however, neither gate 104 nor gate 111 is enabled at this time to cause decimal point counter 22 to be advanced each time HOME signal transitions true. Nevertheless, whenever a decimal digit is thereafter entered into the entry register R1 from the keyboard, EPCH signal appears at the input of gate 153 and the necessary SHIFT LEFT R1 signal appears at the output of gate 153. When EPCH transitions false, SHIFT LEFT R1 signal input to gate 140*a* transitions true and the output of gate 140*a* also transitions true, thereby advancing decimal point counter 22 by one count. As will now be evident, decimal point counter 22 is advanced by one count as each decimal digit is entered into entry register R1.

After the last decimal digit of the number has been keyed in, if the total number of decimal digits entered is less than the number of decimal positions specified by decimal position signal generator I, operation of the decimal point control system proceeds as follows. Actuation of a function key sets CFFF 106. Since CFSFF 108 is already set, DIV SET signal does not transition true and decimal point counter 22 is not set at this time to the 16's complement of the thumbwheel setting. However, CFFF 106 reset output false enables gate 104 (since all other inputs are also false at this time) and, as described above, when HOME signal transitions true, the output of gate 104 goes true, resetting DPSFF 105 and advancing decimal point counter 22 by one count. As before, when DPSFF 105 is reset, the set output of DPSFF 105, along with the set output of CFSFF 108, the reset output of CFFF 106 and $\overline{\text{EPCZ}}$ signal are false at the input to gate 111. When HOME signal goes false at the beginning of the data train, the output of gate 111 goes true and SHIFT LEFT R1 signal is produced at the output of gate 153, causing the digits in entry register R1 to be shifted left one order position for each data pass. Also as before, true transition of HOME signal at he end of each data pass causes a corresponding true transition at the output of gate 140*a*, advancing decimal point counter 22 by 1 count for each data pass which shifts left the digits in entry register R1. This sequence of shift left entry register R1-advance decimal point counter 22 continues until DPCZ signal transitions true, at which time entry phase counter 26 is stepped off zero and gates 104 and 111 are disabled, thereby ending decimal alignment.

A decimal interlock is provided as part of the decimal point control system of FIG. 373 which prevents entry of more than the specified number of decimal digits. Assuming the system of FIG. 373 is conditioned for entry of decimal digits (CFFF 106 reset, DPSFF 105 set, DPCZ signal false), DPSFF 105 reset output at the input of inverting OR-gate 112 (FIG. 235) is false. $\overline{\text{DPCZ}}$ signal, the inverted output of gate 140, is true, inverted false by gate 112 and applied as one input to inverting AND-gate 125 (FIG. 237). When a digit key is actuated by the operator, CDFF 107 sets and CDFF 107 reset output applied to the input of gate 125 is false. Since both inputs thereto are false, the output of gate 125 is true, inverted false by inverting OR-gate 130 (FIG. 239) and applied to the input of inverting AND-gate 132 (FIG. 241). When HOME and $\overline{\text{EPC6}}$ signals both transition false during digit entry, the output of gate 132 goes true and is applied to D-counter 38 of arithmetic unit 30 of FIG. 372 to condition the D-counter flip-flops to be set to the configuration corresponding to the actuated digit key. So long as $\overline{\text{DPCZ}}$ signal is true at the input of gate 112, gate 132, will be able to produce this true output signal for conditioning D-counter 38. After the number of decimal digits entered into entry register R1 equals the desired number of decimal positions, decimal point counter 22 is advanced from a count of 15 to 0, and $\overline{\text{DPCZ}}$ signal goes false. Since DPSFF 105 reset output is still false (no function key yet actuated), both inputs to gate 112 are false and the output of this gate is true. Accordingly, the output from gate 125 is false, inverted true by gate 130, and gate 132 is thus disabled. With gate 132 disabled, D-counter 38 is likewise disabled from accepting any further digits from the keyboard. Thus, one the number of decimal digits entered into entry register R1 equals the number of desired decimal positions, no more digits will be accepted for entry by the calculator. This decimal interlock feature prevents the digits already entered from being destroyed or otherwise affected by operator attempts to enter more decimal digits than the number of specified decimal positions.

What is claimed is:

1. An electronic calculator comprising a memory having a plurality of registers for storing data, each of said registers having an ordered plurality of digit positions, an arithmetic and control unit coupled to said memory for processing said data, an entry means coupled to said memory for entering data into said registers, and means coupled to said arithmetic and control unit for decimally aligning said data in said registers, said last-named means including:

a manually actuatable switch for establishing a decimal point reference position intermediate adjacent ones of said digit positions in said registers;

a counter coupled to said switch for storing a numerical value related to the state of said switch; and means coupled to said counter for shifting the data within at least one of said registers a number of digit positions determined by said numerical value in said counter, whereby said data is aligned relative to said decimal point reference position.

2. The calculator of claim 1 wherein said entry means includes a decimal point key; and said decimal aligning means includes means coupled to said decimal point key and responsive to the actuation thereof for enabling said counter to be incremented in response to the entry of a digit thereafter.

3. The calculator of claim 1 further including display means coupled to said switch for indicating said decimal point reference position.

4. The calculator of claim 1 wherein said entry means includes a plurality of function keys for generating signals specifying data processing functions to be performed by said arithmetic and control unit, and said decimal aligning means includes means coupled to at least one of said function keys for enabling said shifting means in response to the generation of the function signal corresponding to said at least one of said function keys.

5. The calculator of claim 4 wherein said at least one of said function keys includes an ENTER key.

6. The calculator of claim 1 wherein said decimal aligning means includes means coupled to said shifting means for incrementing said counter for each single position shift of said data within said at least one of said registers.

7. The calculator of claim 1 wherein said decimal aligning means further includes means coupled to said counter for disabling said shifting means in response to the occurrence of a predetermined setting in said counter.

8. The calculator of claim 1 wherein said at least one of said registers includes the entry register of said memory.

9. In an electronic calculator, the combination comprising:

memory means for cyclically channelling data in the form of digit words through a closed loop;

means for displaying said data in accordance with an order of significance to form register words arranged in a stack;

means coupled to said display means and said memory means for synchronizing the operation therebetween;

means coupled to said display means for providing a decimal point reference for said register words; and means coupled to said memory means for aligning said register words in said stack about said decimal point reference.

10. The calculator of claim 9 further including an arithmetic unit coupled to said memory means for combining a plurality of said register words into a single register word by arithmetic process, and means coupled to said arithmetic unit and responsive to the production of said single register word for enabling said aligning means to align said single register word about said decimal point reference.

11. A electronic calculating device comprising a recirculating memory for serially recirculating a field word of data;

an arithmetic unit coupled to said recirculating memory for performing data handling and arithmetic operations on said data, said arithmetic unit comprising a plurality of single character registers, selected ones of said plurality of registers being interconnected to form a subplurality of said registers for providing a normal path for progression of said data through said arithmetic unit, at least one other of said registers being interconnected between a pair of said subplurality of registers to provide alternate paths for enabling modification of said field word; and control means coupled to said arithmetic unit for controlling the path of said data through said arithmetic unit.

12. The device of claim 11 wherein said subplurality of registers includes first and second registers;

said first register being connected in parallel to said second register;

said at least one other register being coupled in parallel between said first and said second registers; and wherein said control means includes means for enabling transfer of data between said first and said at least one other register, and means for preventing transfer of data between said first and said second registers.

13. The device of claim 12 wherein said subplurality of registers further includes a fourth register coupled in parallel to said first and said second registers.

14. The device of claim 13 wherein said control means further includes means for enabling transfer of data between said first and said fourth registers and means for enabling transfer of data between said second and said fourth registers.

15. The device of claim 12 further including an entry means coupled to said at least one other register for entering data therein.

16. The device of claim 12 wherein said at least one other register is coupled to said recirculating memory, and said control means includes means for enabling transfer of data from said recirculating memory directly to said at least one other register.

17. The device of claim 12 further including a display means coupled to said at least one other register for indicating the contents of said recirculating memory, and wherein said control means includes means for enabling said display means.

18. The device of claim 11 wherein said recirculating memory includes read means coupled to said arithmetic unit for serially reading said data into said arithmetic unit and write means coupled to said arithmetic unit for serially writing said data into said recirculating memory.

19. The device of claim 11 wherein said control means includes an adding means coupled to said subplurality of registers for combining selected portions of said data in said recirculating memory to form resultant data representing the algebraic sum of said selected portions.

20. In an electronic desk top calculator:

an entry register having a plurality of digit order positions;

digit entry means for entering numeric data into said entry register;

means for shifting said data within said entry register to adjacent order positions, including means for generating a COUNTER INCREMENT signal for each shift of said data by one order position;

means for enabling said shifting means; and a decimal point control system for decimal alignment of said data in said entry register to a predetermined decimal significance, said last-named means comprising:

a decimal position signal generator for generating a DECIMAL NUMBER signal specifying the total desired number of decimal digit positions in said entry register;

a counter coupled to said decimal position signal generator for controlling the total number of data shifts during decimal alignment;

means for enabling said counter;

said counter having an input coupled to said COUNTER INCREMENT signal generating means for incrementing said counter in response to the appearance of said COUNTER INCREMENT signal whenever said counter is enabled;

said counter having an output coupled to said shifting means for disabling said shifting means when said counter reaches a predetermined state so that said data is shifted the required number of order positions to decimal align said data said total desired number of decimal digit positions.

21. The apparatus of claim 20 wherein said means for enabling said counter includes a plurality of entry gates coupled to said counter and said decimal position signal generator, and means for enabling said entry gates.

22. The apparatus of claim 21 wherein said means for enabling said entry gates includes at least one manually actuable function key.

23. The apparatus of claim 21 wherein said means for enabling said entry gates includes a decimal point circuit including a manually actuatable decimal point key for generating a DECIMAL POINT signal indicating termination of entry of the whole number portion of said data, so that said counter is enabled whenever decimal digits are entered into said entry register.

24. The apparatus of claim 23 further including a decimal interlock circuit coupled to said counter and said decimal point circuit for generating a DECIMAL INTERLOCK signal for disabling said entry means whenever said counter reaches said predetermined state after said decimal point key has been actuated.

25. The apparatus of claim 20 wherein said means for enabling said counter includes means for setting said counter to the N's complement of said desired number of digit positions specified by said decimal position signal generator, where N equals the total number of possible states of said counter.

26. The apparatus of claim 25 wherein N equals 16.

27. The apparatus of claim 20 wherein said counter is advanceable and said predetermined state comprises the zero state.

* * * * *